April 10, 1928.
A. B. CLISSON
1,665,655
FLEXIBLE JOINT
Filed Sept. 20, 1923
2 Sheets-Sheet 1
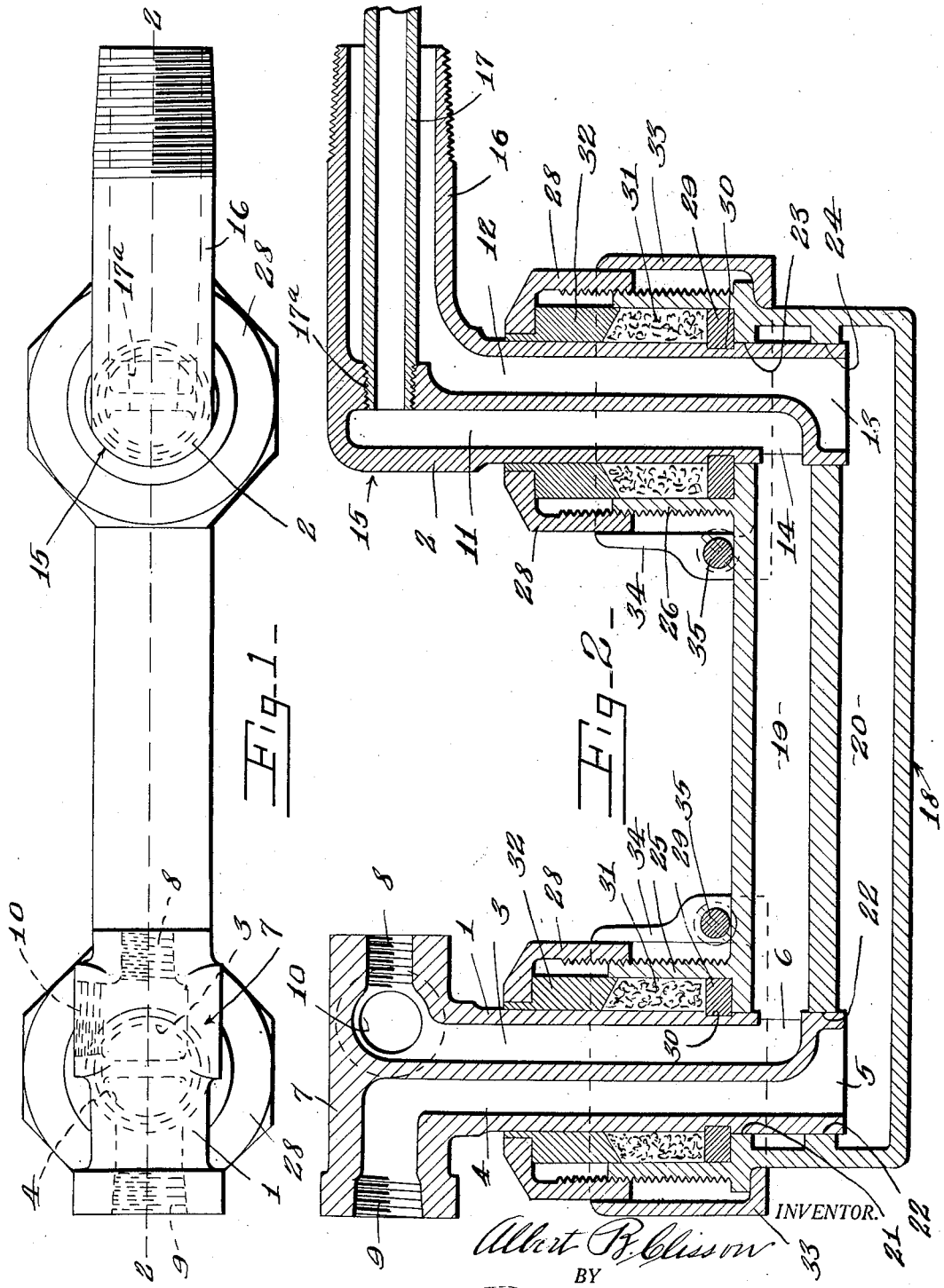
INVENTOR.
Albert B. Clisson
BY
Parsons & Bodell.
ATTORNEYS April 10, 1928.
A. B. CLISSON
1,665,655
FLEXIBLE JOINT
Filed Sept. 20, 1923
2 Sheets-Sheet 2
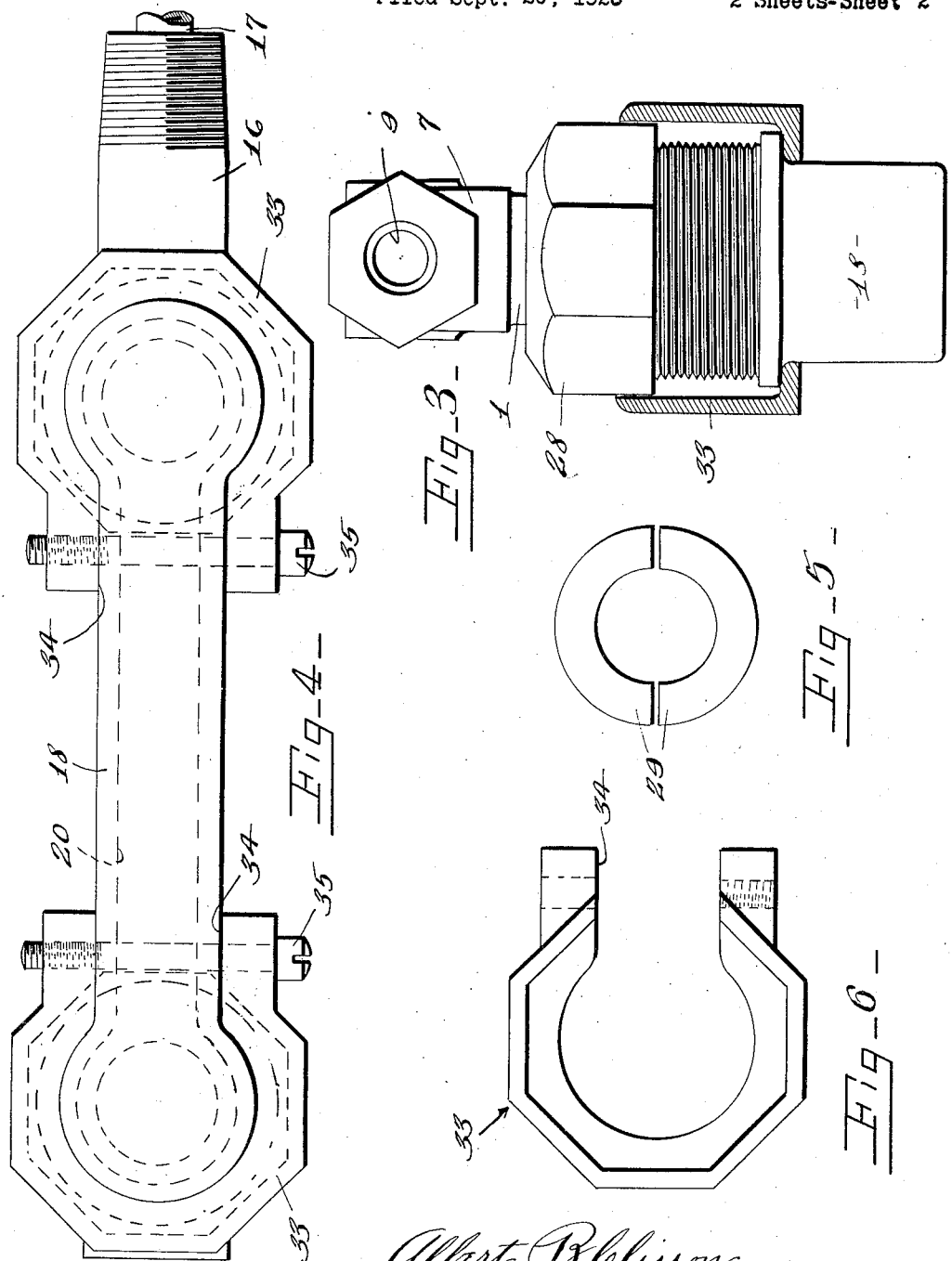

Patented Apr. 10, 1928.

1,665,655

UNITED STATES PATENT OFFICE.

ALBERT B. CLISSON, OF GEDDES, NEW YORK, ASSIGNOR, BY MESNE ASSIGNMENTS, TO THE PROSPERITY COMPANY, INC., A CORPORATION OF NEW YORK.

FLEXIBLE JOINT.

Application filed September 20, 1923. Serial No. 663,918.

This invention relates to a flexible coupling of the class described, having inlet and return passages for fluid, as steam, and has for its object a particularly simple efficient and compact coupling particularly adapted to connect two parts to conduct fluid, as steam, to and from one of said parts, which has a relative or pivotal movement.

The coupling is particularly useful for use in garment pressing machines, which have upper fluid heated press heads carried by a lever or pivoted yoke; and one end of the coupling is mounted coaxially with the axis of the yoke and the other end connected to the press head which, in addition to the pivotal movement with the yoke, has a movement relative to the yoke. One type of machine to which this coupling is applicable is illustrated in the patent of A. C. Austin, No. 1,252,988, issued January 8, 1918.

The invention consists in the novel features and in the combinations and the constructions hereinafter set forth and claimed.

In describing this invention, reference is had to the accompanying drawings in which like characters designate corresponding parts in all the views.

Figure 1 is a side elevation of this coupling, parts being omitted.

Figure 2 is a longitudianl sectional view taken centrally on line 2—2, Figure 1.

Figure 3 is an end elevation, partly in section.

Figure 4 is an opposite side elevation from that seen in Figure 1, the cap for preventing turning of the nut being shown.

Figure 5 is a detail view of the collar on each pivot.

Figure 6 is a detail view of one of the caps shown in Fig. 4.

This flexible coupling comprises generally pivots or pivotal conduits having inlet or return passages therethrough, a single or unitary connecting member or body having bearings for the pivots and also lengthwise inlet return passages communicating with the inlet and return passages of the pivots, a packing for preventing leakage associated with each bearing and means for tightening the packing and securing the pivot to the connecting member.

1 and 2 designate the pivots, the pivot 1 having inlet and return passages 3, 4, the return passage 4 opening at 5 through the inner end of the pivot 1 and the inlet passage 3 opening at 6 through a lateral side of the pivot 1 near the inner end of the pivot. The pivot 1 is also provided at its outer end with a head 7 provided with means, as a tapped hole 8, for connection to an inlet pipe for the fluid, as steam, also means, as a tapped hole 9, for connection to an outlet pipe. The head is also provided with means, as a tapped hole 10, in which a pressure gauge may be mounted.

The pivot 2 is also provided with an inlet passage 11 and a return passage 12, the return passage opening at 13 through the inner end of the pivot and the inlet passage opening at 14 through a lateral side of the pivot 2. The pivot 2 is also provided with a head 15 at its outer end, this head including a conduit 16 which threads into the part as the upper press head to which the coupling is connected, the conduit 16 communicating with the return passage 12. The head 15 is also provided with a pipe 17 arranged within the conduit 16 and threading into a tapped hole 17$^a$ in a wall separating the passages 11, 12, the pipe 17 thus communicating with the inlet passage 11.

18 is the body or connecting member having bearings mounted on the pivots 1, 2, this member 18 being formed with inlet and return passages 19, 20 therethrough, which passages extend lengthwise of said member. The member 18 is also provided with bores 21, 22 and 23, 24 for receiving the inner ends of the pivots 1, 2 respectively and in which these inner ends are journalled. That is, the inner end of the pivot 1 is journalled at the inner end in the bores 21, 22, and the inner end of the pivot 2 in the bores 23, 24. These bores 21, 22 and 23, 24 constitute what may, for convenience be called internal bearing portions, and the bearings of said member 18, for the pivots 1, 2 also include external bearing portions 25, 26 of greater diameter than the diameters of the pivots 1, 2. Each pivot, 1 or 2, is held from endwise movement, that is, from displacement by means as a collar arranged in the external bearings 25 or 26 and thrusting against the bottom of external bearing and held from endwise movement relatively to the pivot 1 or 2 and an element operating to thrust against said collar to hold it against such bottom. Said element, as here shown, is a nut 28 threading on each external bearing 25 or 26, and the means thrusting against the bottom of each enlarged bearing 25 or 26, as here shown, comprises a split collar 29 usually for convenience in assembling consisting of two semi-circular halves, the collar fitting into an annular groove at 30 in each pivot 1 or 2, and such collar substantially fitting the bore of the external bearing 25 or 26 and thrusting directly against the bottom thereof, 31 is a packing arranged about each pivot 1 or 2 in the external bearing 25 or 26 and thrusting against the collar 29. 32 is a collar mounted on each pivot 1 or 2 between the head of the nut 28 and the packing 31 and acting to compress the packing when the nut is screwed on to the bearing 25 or 26.

The return passages 4 and 12 of the pivots 1 and 2 open into the return passage 20 of the member 18; and the inlet passages 3 and 11 open into the inlet passage 19 of the connecting member 18. The steam passes from the source of supply through the opening 8 into the inlet passage 3 of the pivot 1 through the passage 19 of the connecting member 18, passage 11 of the pivot 2 and the pipe 17 from which it is delivered to the chamber of the press head of a pressing machine, and after circulating through the chamber of the head, returns through the conduit 16, passage 12, of the pivot 2, passage 20, of the member 18, passage 4 of the pivot 1 and out through the passage 9.

Owing to the fact that the pivotal movement about the pivots 1, 2 are different, the packings wear differently and it is necessary to oftentimes adjust one more than the other and usually in flexible couplings the one not requiring adjustment prevents the proper tightening of the bearing requiring adjustment or, when one requires less adjustment than the other, the latter cannot be tightened sufficiently where the amount of its adjustment depends upon the amount the former can be adjusted.

In this coupling, each pivotal joint can be adjusted independently of the other and to any extent without being affected by the adjustment of the other.

In order to hold the nut from turning during pivotal movement, means associated with a connecting member or body 18 is provided for holding each nut in its adjusted position. This means, as here shown, comprises a cap 33 fitting over each end of the member 18 from the side thereof, opposite to that on which the conduit 1 or 2 is located, the cap having a passage 34 which permits it to move transversely of the member 18 and the cap also being shaped to receive the nut 28 which is angular. The cap is normally held from displacement in any suitable manner as by a retaining member as a screw 35 extending through the portions thereof on the opposite sides of the passage 34 and arranged on the inner side of the member 18, that is, on the same side of such member as the pivots 1, 2. By reason of this locking means the adjustment of the nut is not upset during the operation of the couplings.

What I claim is:

1. A flexible coupling of the class described, comprising parallel pivotal conduits, each having an inlet and return passages therethrough, a body member U-shaped in general form, the arms of the U-shaped member forming bearings in which said pivotal conduits are journalled, the intermediate part of the U-shaped body being formed with inlet and return passages communicating respectively with the inlet and return passages of the pivotal conduits, and said conduits extending through the bearings and into the intermediate part of the U-shaped body, the bearings being formed with internal shoulders, and the pivotal conduit having thrust bearing against said shoulders, a packing in each bearing, thrusting toward the shoulders, and a nut enclosing each pivotal conduit and threading on the adjacent bearing.

2. A flexible coupling of the class described, comprising pivotal conduits arranged parallel to each other, each pivotal conduit being formed with a partition dividing it into parallel inlet and return passages, one of said passages opening through the end of the pivotal conduit and the other opening through the side of the conduit near such end, a body member having bearings at its end in which the pivotal conduits are mounted, the body being formed with a lengthwise partition dividing it into parallel inlet and return passages communicating at the ends of the body with the passages of the pivotal conduits, and a packing nut encircling each pivotal conduit and threading on the adjacent bearing.

In testimony whereof, I have hereunto signed my name, at Syracuse, in the county of Onondaga, and State of New York, this 13th day of September, 1923.

ALBERT B. CLISSON.